(12) United States Patent
Iida et al.

(10) Patent No.: US 7,883,269 B2
(45) Date of Patent: Feb. 8, 2011

(54) STRUCTURE FOR CLOSING A RAIL MOUNTING HOLE

(75) Inventors: Katsuya Iida, Tokyo (JP); Yoshiaki Saito, Tokyo (JP); Masahiro Kumagai, Tokyo (JP); Reinhard G. Welle, Ratingen (DE)

(73) Assignees: THK Co., Ltd., Tokyo (JP); THK GmbH, Ratingen (DE)

( * ) Notice: Subject to any disclaimer, the term of this patent is extended or adjusted under 35 U.S.C. 154(b) by 636 days.

(21) Appl. No.: 11/883,422

(22) PCT Filed: Dec. 15, 2005

(86) PCT No.: PCT/JP2005/023054

§ 371 (c)(1),
(2), (4) Date: Feb. 5, 2008

(87) PCT Pub. No.: WO2006/082686

PCT Pub. Date: Aug. 10, 2006

(65) Prior Publication Data

US 2009/0010577 A1     Jan. 8, 2009

(30) Foreign Application Priority Data

Feb. 1, 2005     (JP)     ............................. 2005-025290

(51) Int. Cl.
*F16C 32/06*     (2006.01)
*F16C 29/08*     (2006.01)

(52) U.S. Cl. ........................... 384/15; 384/45; 220/200; 215/224

(58) Field of Classification Search .................. 384/13, 384/15, 45; 29/450, 881; 285/45, 86; 424/422, 424/473; 220/220, 293, 298, 287, 788, 792; 215/200, 211, 220, 224

See application file for complete search history.

(56) References Cited

U.S. PATENT DOCUMENTS 5,351,385 A * 10/1994 Takano ........................ 29/450
(Continued)

FOREIGN PATENT DOCUMENTS

JP     60-101306 A     6/1985
(Continued)

OTHER PUBLICATIONS

Notification of Transmittal of Translation of the International Preliminary Report on Patentability (Form PCT/IB/338) of International Application No. PCT/JP2005/023054 mailed Feb. 14, 2008 with translation Forms PCT/IPEA/409.
(Continued)

*Primary Examiner*—Marcus Charles
(74) *Attorney, Agent, or Firm*—Westerman, Hattori, Daniels & Adrian, LLP

(57) ABSTRACT

A structure for closing a track rail mounting hole is disclosed, which prevents a closing cap from being press-fitted with an inclined state into the rail mounting hole, thereby being capable of positively preventing formation of a gap between the rail mounting hole and the closing cap. The closing cap includes a fitting portion having an outer diameter larger than an inner diameter of the rail mounting hole, to be press-fitted into the rail mounting hole; and a leading end portion to be inserted into the rail mounting hole before press-fitting the fitting portion into the rail mounting hole, for provisionally positioning the closing cap with respect to the rail mounting hole.

7 Claims, 4 Drawing Sheets

U.S. PATENT DOCUMENTS

| | | | |
|---|---|---|---|
| 5,554,455 A * | 9/1996 | Inoue et al. | 429/53 |
| 6,524,305 B1 * | 2/2003 | Peterson et al. | 424/422 |
| 2003/0001384 A1 * | 1/2003 | Carroll | 285/45 |

FOREIGN PATENT DOCUMENTS

| | | | | |
|---|---|---|---|---|
| JP | 60101306 A | | 6/1985 | |
| JP | 066212 U | | 5/1986 | |
| JP | 61066212 U | | 5/1986 | |
| JP | 117914 U | | 10/1992 | |
| JP | 04117914 U | | 10/1992 | |
| JP | 07158564 A | * | 6/1995 | |
| JP | 08-61507 A | | 3/1996 | |
| JP | 0861507 A | | 3/1996 | |
| JP | 2000010389 A | * | 1/2000 | |
| JP | 2000-213650 A | | 8/2000 | |
| JP | 2000213650 A | | 8/2000 | |
| JP | 2002-48138 A | | 2/2002 | |
| JP | 200248138 A | | 2/2002 | |
| JP | 2002-98231 A | | 4/2002 | |
| JP | 200298231 A | | 5/2002 | |
| JP | 2002227838 A | * | 8/2002 | |
| JP | 2003222291 A | * | 8/2003 | |
| JP | 2004346974 A | * | 12/2004 | |

OTHER PUBLICATIONS

International Search Report of PCT/JP2005/023054, date of mailing Mar. 20, 2006.

* cited by examiner

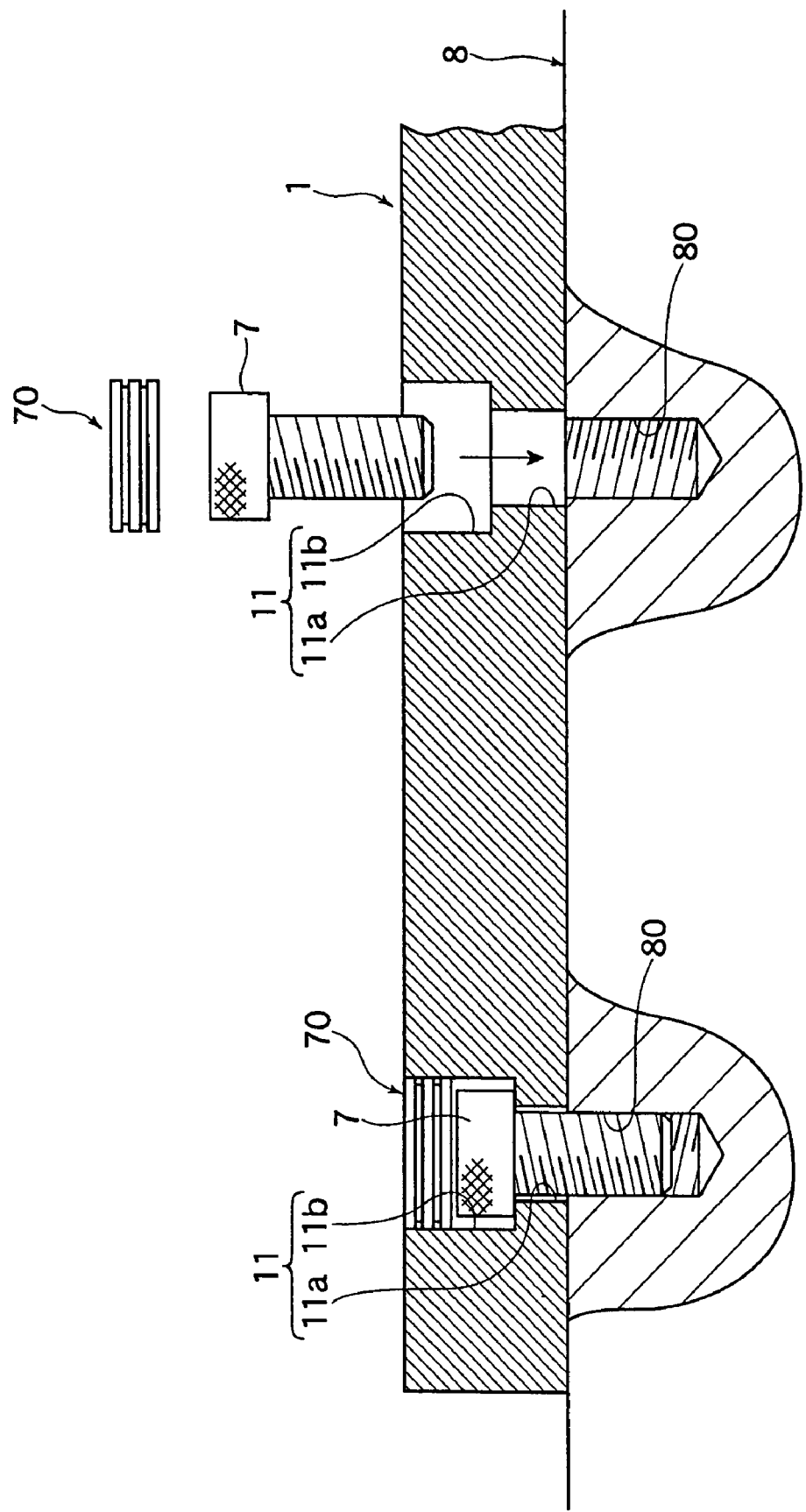

STRUCTURE FOR CLOSING A RAIL MOUNTING HOLE

TECHNICAL FIELD

The present invention relates to a guide device which is used for a linear guide portion or a curved guide portion of a machine tool or various industrial robots, for guiding a movable body such as a moving table in a freely reciprocating manner. The guide device for those is composed of a slider on which the movable body is mounted and a track rail for guiding the slider. The present invention provides a structure for closing, in a case where a rail mounting hole is provided in the track rail, the rail mounting hole after fixing the track rail.

BACKGROUND ART

Conventionally, as the linear guide device constituting a linear guide portion of the machine tool or various industrial robots, there is known a device composed of a linear track rail on which a ball rolling surface is formed along a longitudinal direction thereof and a slider attached to the track rail through intermediation of a plurality of balls. The slider includes a load rolling surface opposed to the ball rolling surface of the track rail, and a circulation passage allowing endless circulation of the plurality of balls rolling while being applied with load between the load rolling surface and the rolling surface of the track rail. By allowing the balls to circulate in the endless circulation passage, the slider can continuously move in an overall length of the track rail.

Normally, the track rail is fixed to a base portion such as a bed or a column of the machine tool or the like by fastening fixing bolts. Therefore, rail mounting holes for allowing the fixing bolts to pass therethrough are formed to pass through the track rail at predetermined intervals along the longitudinal direction thereof. A head portion of the fixing bolt protruding on the track rail becomes an obstacle to movement of the slider along the track rail, so an inner portion of the rail mounting hole is divided into two sections including a small diameter portion and a large diameter portion. The small diameter portion has an inner diameter which is slightly larger than a nominal diameter of the bolt. The large diameter portion has an inner diameter which is slightly larger than the head portion of the bolt. That is, the large diameter portion constitutes an accommodation portion for the bolt head portion, thereby preventing the bolt head portion from protruding on a surface of the track rail.

However, the rail mounting hole becomes a cause of entry of a foreign substance such as shaving of a work or a coolant liquid in the machine tool into an inside of the slider moving along the track rail. In the slider, the balls circulate while being applied with a load between the slider and the track rail. When the foreign substance such as shaving of a work or refuse enters the inside of the slider, scars are generated on the rolling surface of the track rail and the balls on the load rolling surface of the slider, or wear of those is promoted, thereby causing movement accuracy of the slider in the linear guide device to be impaired early. When the coolant liquid used for cooling a work in the machine tool enters the inside of the slider, lubricating oil adhering to surfaces of the balls is washed away, thereby causing early wear of the rolling surface and the balls as well. In order to prevent the foreign substance from entering the inside of the slider, a seal member brought into slide contact with the track rail is provided on a periphery of the slider so as to eliminate the foreign substance adhering to the surface of the track rail when the slider moves. However, in a case where the rail mounting hole is provided in the track rail, the foreign substance enters the inside of the slider through the rail mounting hole, so an effect of the seal member is deteriorated. Further, the seal member comes into contact with the surface of the track rail with a certain level of fastening force, so in the case where the rail mounting hole is provided, there is a problem in that a leading end of the seal member is rubbed against an opening edge of the rail mounting hole, thereby causing the seal member to be deteriorated at an early stage.

Accordingly, in a case where the linear guide device is used under an environment in which the foreign substance easily adheres to the track rail, there is adopted a measure in which, after the track rail is mounted to the base portion by the fixing bolts, a closing caps are adapted to the rail mounting holes of the track rail, thereby closing the rail mounting holes. The closing cap is fitted into the large diameter portion so as to cover the head portion of the fixing bolt accommodated in the large diameter portion of the rail mounting hole, and the closing cap is flush with the surface of the track rail.

As the closing cap, a metal closing cap is disclosed in JP 2002-48138 A. The closing cap is composed of a fitting portion press-fitted into the large diameter portion of the rail mounting hole and an introduction portion inserted into the rail mounting hole before the fitting portion. The fitting portion has a press-fitting interference and is formed to have a larger outer diameter than the inner diameter of the large diameter portion of the rail mounting hole. By being applied with an external force from above by using a tool such as a hammer, the fitting portion is press-fitted into the large diameter portion of the rail mounting hole. Further, the fitting portion has a plurality of clearance grooves formed therein. The clearance grooves serve to mitigate stress caused by the press-fitting. The introduction portion is formed in a columnar shape having an outer diameter slightly smaller than the inner diameter of the large diameter portion of the rail mounting hole. The introduction portion is inserted into the rail mounting hole before the press-fitting of the fitting portion, thereby preventing the closing cap from being press-fitted into the rail mounting hole while being inclined.

Patent Document 1: JP 2002-48138 A

DISCLOSURE OF THE INVENTION

Problems to be Solved by the Invention

However, an outer peripheral surface of the introduction portion has a gap with respect to an inner peripheral surface of a rail mounting hole. Therefore, even when the introduction portion is inserted into the rail mounting hole before a fitting portion, in a case where the introduction portion inserted into the rail mounting hole is decentered with respect to the rail mounting hole, the fitting portion itself is decentered with respect to the rail mounting hole. On the other hand, in order to prevent the closing cap which has been press-fitted from falling off in the rail mounting hole, the press-fitting interference of the fitting portion has to be larger than a certain size. Therefore, the press-fitting of the fitting portion into the rail mounting hole requires application of a large force using a tool as described above. Thus, in the case where the introduction portion is decentered with respect to the rail mounting hole, when an external force is applied to the fitting portion at once by using a tool, there is a risk of the closing cap being press-fitted while being inclined.

When the closing cap is press-fitted into the rail mounting hole while being inclined, a gap is formed between the closing cap and the rail mounting hole. As a result, a foreign substance such as shaving of a work enters an inside of a slider through the gap.

Means for Solving the Problems

The present invention has been made in view of the above-mentioned problems. It is therefore an object of the present invention to provide a structure for closing a track rail mounting hole, which prevents a closing cap from being press-fitted with a inclined state into the rail mounting hole, thereby being capable of positively preventing formation of a gap between the rail mounting hole and the closing cap.

That is, the present invention relates to a structure for closing the rail mounting hole provided in the track rail of a guide device. The closing cap is composed of a fitting portion and a leading end portion. The fitting portion has an outer diameter larger than an inner diameter of the rail mounting hole formed in the track rail, has a substantially columnar shape, and is press-fitted into the rail mounting hole. On the other hand, the leading end portion is inserted into the rail mounting hole before the fitting portion, and allows the closing cap to be provisionally positioned with respect to the rail mounting hole before press-fitting the fitting portion.

In order to provisionally position the closing cap with respect to the rail mounting hole, a positioning protrusion is formed on a periphery of the leading end portion. On a tip of the positioning protrusion, there is formed a tip edge portion of which a minute area comes into contact with an inner peripheral surface of the rail mounting hole. An outer diameter of the tip edge portion is set to be the same as or slightly larger than the inner diameter of the rail mounting hole.

As a result, for fixing the closing cap to the rail mounting hole, when the leading end portion is inserted into the rail mounting hole first, the tip edge portion slightly interferes with the inner peripheral surface of the rail mounting hole. In a case where the outer diameter of the tip edge portion is completely identical with the inner diameter of the rail mounting hole, the leading end portion of the closing cap fits into the rail mounting hole with no gap therebetween. By lightly pushing the leading end portion into the rail mounting hole, the closing cap can be provisionally positioned with respect to the rail mounting hole. Further, also in a case where the outer diameter of the tip edge portion is slightly larger than the inner diameter of the rail mounting hole, by lightly pushing the leading end portion into the rail mounting hole, the tip edge portion, that is, a protruding end of the positioning protrusion can be crushed, thereby making it possible to easily fit the leading end portion into the rail mounting hole.

That is, without applying a large force by using a tool, an operator can allow the leading end portion of the closing cap to fit into the rail mounting hole with no gap therebetween. As a result, before an operation of press-fitting the fitting portion into the rail mounting hole by using a tool, the operator can provisionally position the closing cap accurately with respect to the rail mounting hole by a manual operation. The press-fitting operation of the fitting portion using a tool can accurately and smoothly be performed. Therefore, it is possible to prevent the closing cap from being press-fitted into and fixed to the rail mounting hole while being inclined with respect thereto.

BRIEF DESCRIPTION OF THE DRAWINGS

FIG. 3 is a sectional view showing a state where fixing bolts and closing caps are mounted onto a track rail.

FIG. 4b is an enlarged view of a portion A of FIG. 4a.

FIG. 5b is an enlarged view of a portion B of FIG. 5a.

FIG. 6b is an enlarged view of a portion C of FIG. 6a.

FIG. 7b is an enlarged view of a portion D of FIG. 7a.

DESCRIPTION OF SYMBOLS

1 . . . track rail, 2 . . . slider, 8 . . . base portion, 11 . . . rail mounting hole, 70 . . . closing cap, 71a . . . first fitting portion, 71b . . . second fitting portion, 72 . . . leading end portion, 73 . . . spacer portion, 74 . . . positioning protrusion, 75 . . . tip edge portion.

BEST MODE FOR CARRYING OUT THE INVENTION

Hereinafter, a detailed description will be made of a closing structure for a rail mounting hole according to the present invention with reference to the attached drawings.

Figure 1:
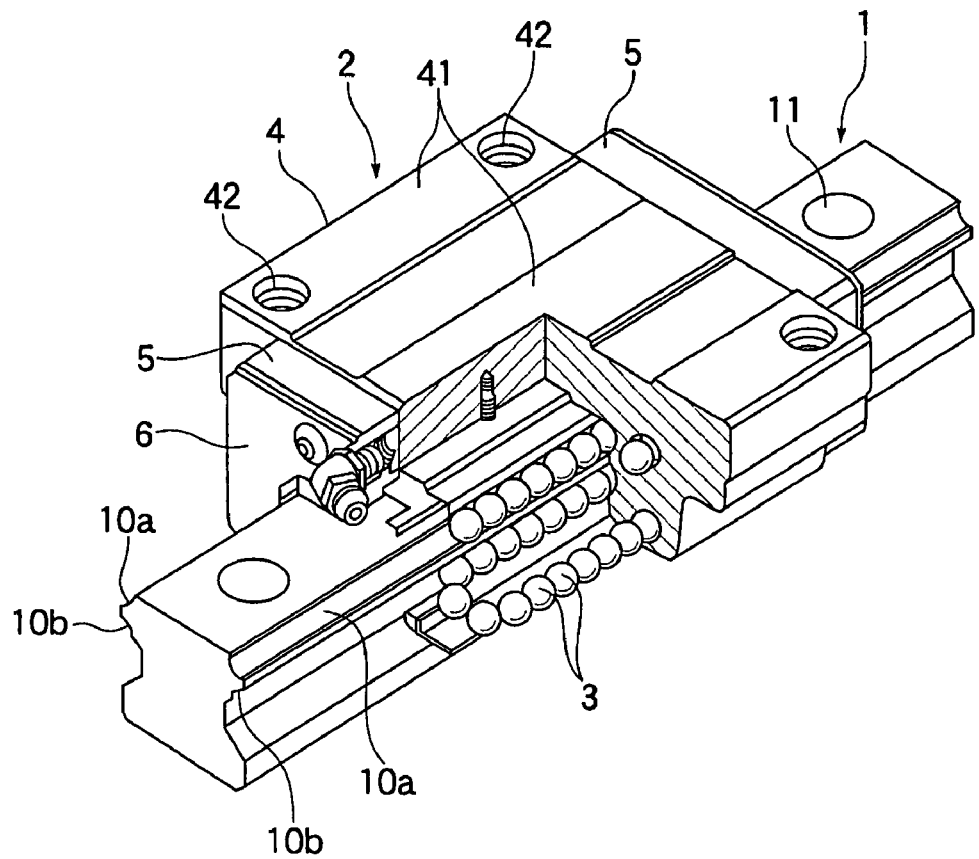
FIG. 1 is a perspective view showing an example of a linear guide device to which the present invention can be applied.
Figure 2:
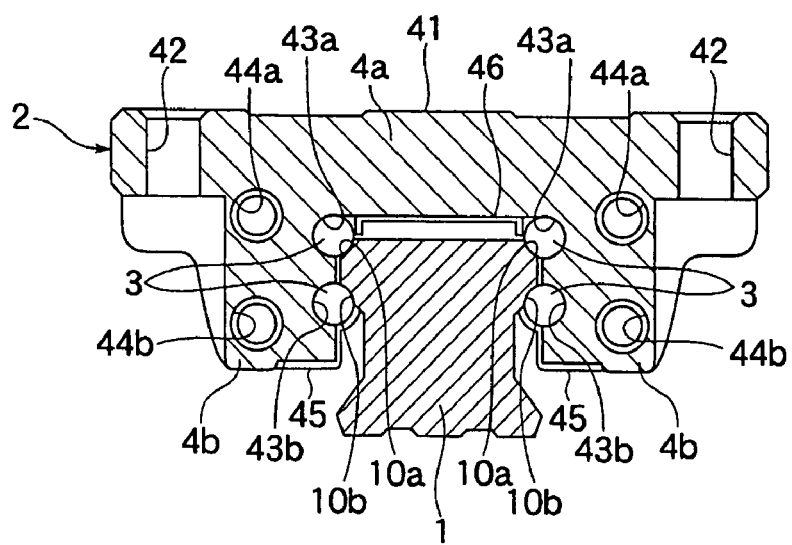
FIG. 2 is a vertical sectional view of the linear guide device shown in FIG. 1.

FIGS. 1 and 2 show an example of a linear guide device including a track rail, to which the present invention can be applied. The linear guide device is composed of a track rail 1 provided onto a base portion such as a bed, and a slider 2 movable along the track rail 1. The slider 2 can freely move on the track rail 1.

The track rail 1 is formed to have a substantially rectangular section, and has ball rolling grooves 10a and 10b in which balls 3 roll, the ball rolling grooves 10a and 10b are formed along a longitudinal direction in four lines in total. The ball rolling grooves 10a and 10b are formed in both side surfaces of the track rail 1. The ball rolling grooves 10a positioned on an upper side are formed upwardly by 45° with respect to a horizontal direction on a plane of FIG. 2. On the other hand, the ball rolling grooves 10b positioned on a lower side are formed downwardly by 45° with respect thereto. Further, the track rail 1 is provided with rail mounting holes 11 formed at appropriate intervals in the longitudinal direction thereof. The track rail 1 is fixed to the base portion, serving as a surface on which mounting is performed, by fixing bolts (not shown) which are inserted into the rail mounting holes 11.

On the other hand, the slider 2 includes a moving block 4 having a mounting surface 41 for a movable body such as a table and tap holes 42 with which fixing bolts of the movable body are threadingly engaged, and a pair of cover bodies 5 and 5 fixed to both front and rear end surfaces of the moving block 4. The cover bodies 5 are fixed to the moving block 4, thereby providing endless circulation passages for the balls 3 in the slider. Further, to the cover body 5, a seal member 6 brought into sliding contact with the track rail 1 is attached, thereby preventing refuse or the like adhering to the track rail 1 from entering an inside of the slider 2 when the slider 2 moves.

First, the moving block 4 includes a horizontal portion 4a, on which the mounting surface 41 is formed, and a pair of skirt portions 4b and 4b hanging from the horizontal portion 4a, and is formed in a substantially saddle-like section. On a lower surface side of the horizontal portion 4a and an inner surface side of each skirt portion 4b, there are linearly formed four lines of load rolling grooves 43a and 43b which correspond to the ball rolling grooves 10a and 10b of the track rail 1, respectively. Further, in the horizontal portion 4a and the each skirt portion 4b, there are formed ball returning holes 44a and 44b corresponding to the load rolling grooves 43a and 43b, respectively. Through U-shaped direction turning passages formed in the cover bodies 5, the load rolling grooves 43a and 43b and the ball returning holes 44a and 44b corresponding thereto are respectively connected to each other, thereby forming the endless circulation passages for the balls.

As a result, the balls 3 applied with load between the ball rolling grooves 10a and 10b of the track rail 1 and the load rolling grooves 43a and 43b of the moving block 4, respectively, are released from the load after finishing rolling in the load rolling grooves 43a and 43b when the slider 2 moves. The balls 3 then enter the direction turning passages in one of the cover bodies 5 and directly roll in a non-load state in the ball returning holes 44a and 44b of the moving block 4 in a direction opposite to a rolling direction in the load rolling grooves 43a and 43b. Further, the balls 3 which have completed to roll in the ball returning holes 44a and 44b again enter spaces between the track rail 1 and the moving block 4 through the direction turning passages in the other cover body 5, and roll in the load rolling grooves 43a and 43b while being applied with load.

To a lower end of each of the skirt portions 4b and a lower surface of the horizontal portion 4a of the moving block 4, ball retaining plates 45 and 46 are respectively attached. Each of the ball retaining plates 45 and 46 are molded by press molding of a metal plate, injection molding of a hard synthetic resin, or the like. The ball retaining plates 45 and 46 prevent the balls 3 rolling in the load rolling grooves 43a and 43b from falling off from the slider 2 when the slider 2 is removed from the track rail 1.

FIG. 3 is a sectional view showing a state where the track rail 1 is fixed to a base portion 8 by using fixing bolts 7, in which a horizontal direction on a plane of FIG. 3 corresponds to the longitudinal direction of the track rail 1. As shown in FIG. 3, the rail mounting hole 11 through which the fixing bolt 7 is inserted into the track rail 1 has two sections including a small diameter portion 11a and a large diameter portion 11b. In a state where the fixing bolt 7 is fastened to a tap hole 80 of the base portion 8, a head portion of the fixing bolt 7 is accommodated in the large diameter portion 11b of the rail mounting hole 11. Therefore, a bolt with a hexagonal hole is used as the fixing bolt 7.

In order to prevent refuse from entering the rail mounting hole 11 during use of the linear guide device, after the fixing bolts 7 are fastened to fix the track rail 1 to the base portion 8, closing caps 70 are press-fitted into the rail mounting holes 11, and the large diameter portions 11b of the rail mounting holes 11 are closed on the heads of the fixing bolts 7. As a result, adherence of the seal members 6 fixed to both the front and rear ends in a moving direction of the slider 2 with respect to the track rail 1 is enhanced, thereby making it possible to prevent refuse from entering the inside of the slider from the outside or prevent lubricant from leaking out from the inside of the slider 2 to the outside as much as possible.

Figure 4A:
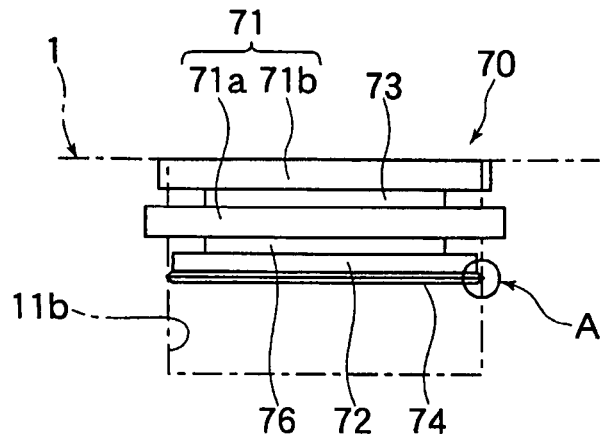
FIG. 4a is a front view showing a first embodiment of a closing cap used in the present invention.
Figure 4B:
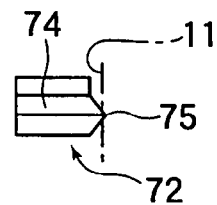

FIG. 4a shows a first embodiment of the closing cap 70 of the rail mounting hole 11 to which the present invention is applied. FIG. 4b is an enlarged view of a portion A of FIG. 4a. The closing cap 70 shown in FIG. 4a includes a fitting portion 71 press-fitted into and fixed to the rail mounting hole 11 of the track rail 1, and a leading end portion 72 inserted into the rail mounting hole 11 before press-fitting the fitting portion 72. Further, the fitting portion 71 includes a first fitting portion 71a and a second fitting portion 71b each of which is formed in a columnar shape. The first fitting portion 71a and the second fitting portion 71b are connected to each other through a spacer portion 73 of a columnar shape.

The first fitting portion 71a and the second fitting portion 71b are formed to have outer diameters larger than the inner diameter of the rail mounting hole 11. The first fitting portion 71a and the second fitting portion 71b are forcibly press-fitted into the rail mounting hole 11 by using a tool, thereby fixing the closing cap 70 to an inlet of the rail mounting hole 11. In this case, the first fitting portion 71a is positioned between the leading end portion 72 and the second fitting portion 71b, and the outer diameter of the first fitting portion 71a is set larger than the outer diameter of the second fitting portion 71b. That is, the outer diameter of the second fitting portion 71b positioned on a side of the inlet of the rail mounting hole 11 with respect to the first fitting portion 71a is formed to be slightly larger than the inner diameter of the rail mounting hole 11, but is set smaller than the outer diameter of the first fitting portion 71a, and interference of the first fitting portion 71a for press-fitting is set larger than that of the second fitting portion 71b.

The press-fitting interference of the second fitting portion 71b, which is positioned on the side of the inlet of the rail mounting hole 11, is set to be relatively small, thereby preventing generation of burr on the surface of the track rail 1 as much as possible at a time of press-fitting of the closing cap 70 with respect to the rail mounting hole 11. On the other hand, in a case where the press-fitting interference of the whole fitting portion 71 is set to be extremely small, a strength for holding the closing cap 70 to the inlet of the rail mounting hole 11 is insufficient, so there is a risk of the closing cap 70 falling off in the rail mounting hole 11 when the seal member 6 mounted on the slider 2 passes the rail mounting hole 11 while coming into slide contact with the surface of the track rail 1. As a result, in order to increase the fixation strength of the closing cap 70 with respect to the rail mounting hole 11, the outer diameter of the first fitting portion 71a is set larger than the outer diameter of the second fitting portion 71b, thereby ensuring a sufficient press-fitting interference between the first fitting portion 71a and the rail mounting hole 11.

Further, even in a case where the sufficient press-fitting interference is provided between the first fitting portion 71a and the rail mounting hole 11, by providing between the first fitting portion 71a and the second fitting portion 71b the spacer portion 73 having an outer diameter smaller than the inner diameter of the rail mounting hole 11, and providing a gap between the first fitting portion 71a and the second fitting portion 71b, discretion for plastic deformation of the first fitting portion 71a due to the press-fitting is ensured, thereby facilitating the press-fitting of the closing cap 70 with respect to the rail mounting hole 11.

Further, normally, to a corner portion at the inlet of the rail mounting hole 11 and a corner portion on an outer periphery of the closing cap 70, it is required to apply chamfering in order to avoid stress concentration and in consideration of safety for an operator. However, in order to prevent formation of an annular groove in the inlet of the rail mounting hole 11 after press-fitting the closing cap 70 due to the chamfering, the corner portion on the outer periphery of the second fitting portion 71b and the corner portion at the inlet of the rail mounting hole 11 are not chamfered. As a result, the annular groove is not formed in a boundary between the closing cap 70 and the rail mounting hole 11, thereby making it possible to prevent a foreign substance such as refuse from accumulating in the groove.

On the other hand, in the embodiment shown in FIG. 4a, the leading end portion 72 is formed in a substantially columnar shape. A part of an outer peripheral surface of the leading end portion 72 is provided with a continuous annular positioning protrusion 74 formed along a peripheral direction. As shown in FIG. 4b, the positioning protrusion 74 protrudes from the outer peripheral surface of the leading end portion 72 and has a substantially triangular section, and two surfaces of the positioning protrusion 74 intersect each other to form a tip edge portion 75. An outer diameter of the leading end edge portion 75 is formed to be the same as or slightly larger than the inner diameter of the rail mounting hole 11. A diameter of a base circle of the positioning protrusion 74, that is, an outer diameter of the outer peripheral surface of the leading end portion 72 is formed to be smaller than the inner diameter of the rail mounting hole 11. When the leading end portion 72 of the closing cap 70 is inserted into the rail mounting hole 11, only the tip edge portion 75 of the positioning protrusion 74 interferes with an inner peripheral surface of the rail mounting hole 11.

Further, the leading end portion 72 is connected to the first fitting portion 71a so as to be coaxial therewith through a shaft portion 76. An outer diameter of the shaft portion 76 is set smaller than a diameter of the outer peripheral surface of the leading end portion 72. Specifically, the shaft portion 76 is formed to have the same outer diameter as that of the spacer portion 73. Due to the presence of the shaft portion 76, a gap is formed between the leading end portion 72 and the first fitting portion 71a. When the cap 70 is adapted to the rail mounting hole 11, before the first fitting portion 71a is press-fitted, the leading end portion 72 is inserted into the rail mounting hole 11.

In this case, the outer diameter of the positioning protrusion 74 provided to the leading end portion 72, that is, the outer diameter of the tip edge portion 75 is the same as or slightly larger than the inner diameter of the rail mounting hole 11. Therefore, when the leading end portion 72 is inserted into the rail mounting hole 11, the tip edge portion 75 and the rail mounting hole 11 slightly interfere with each other. As a result, when the leading end portion 72 is inserted into the rail mounting hole 11, slight resistance is produced. By pushing the leading end portion 72 into the rail mounting hole 11 against the resistance, it is possible to accurately position, with respect to the rail mounting hole 11, the first fitting portion 71a connected to the leading end portion 72 so as to be coaxial therewith.

For example, the outer diameter of the tip edge portion 75 is a reference diameter which is the same as the inner diameter of the rail mounting hole 11, and may be formed with a plus tolerance. Further, a shape of the leading end portion 72 can be easily obtained by turning.

Resistance produced when the leading end portion 72 is pushed into the rail mounting hole 11 differs according to the outer diameter of the positioning protrusion 74. Since the positioning protrusion 74 is formed to have the substantially triangular section, the operator only lightly pushes the closing cap 70 into the rail mounting hole 11, thereby allowing the tip edge portion 75 to be crushed, making it possible to allow the leading end portion 72 of the closing cap 70 to easily fit into the rail mounting hole 11. As a result, before press-fitting the first fitting portion 71a and the second fitting portion 71b by using a tool, the operator can provisionally position the closing cap 70 with respect to the rail mounting hole 11 without using a tool, and the subsequent press-fitting of the first fitting portion 71a and the second fitting portion 71b can be smoothly and accurately performed. As a result, it is possible to prevent a trouble that the closing cap 70 is press-fitted into and fixed to the rail mounting hole 11 while being inclined with respect thereto.

The closing cap 70 is press-fitted into the rail mounting hole 11 by using a tool. In this case, it is preferable that the closing cap 70 be pushed into the rail mounting hole 11 until an end surface in an axial direction of the second fitting portion 71b completely conforms with the surface of the track rail 1, thereby preventing generation of a step on the surface of the track rail 1. It is natural that complete elimination of the step is difficult, so it is preferable that a minute section of the second fitting portion 71b protruding from the surface of the track rail 1 be trimmed after press-fitting the closing cap 70 into the rail mounting hole 11. As a result, the surface of the track rail 1 can be finished smoothly without a step, and damage of the seal member 6 mounted onto the slider 2 can be prevented.

Figure 5A:
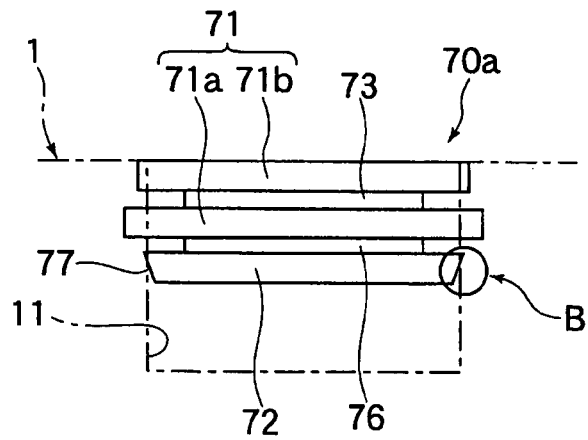
FIG. 5a is a front view showing a second embodiment of a closing cap used in the present invention.
Figure 5B:
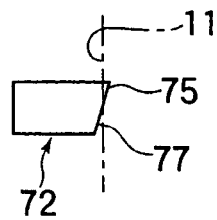

FIG. 5a shows a second embodiment of a closing cap for the rail mounting hole 11, to which the present invention is applied. FIG. 5b is an enlarged view of a portion B of FIG. 5a. In a closing cap 70a shown in FIG. 5a, a first fitting portion 71a and a second fitting portion 71b each have the same structure as that of the closing cap 70 according to the first embodiment of the present invention shown in FIG. 4a, and only the leading end portion 72 has a structure different from that of the first embodiment.

In the closing cap 70a according to the second embodiment, the leading end portion 72 has an outer peripheral surface 77 formed in a tapered shape. An outer diameter of the leading end portion 72 gradually increases toward the first fitting portion 71a. That is, according to the second embodiment of the present invention, by forming the outer peripheral surface 77 of the leading end portion 72 into the tapered shape, a positioning protrusion of a substantially triangular section is provided to the leading end portion 72, and a corner portion on an outer periphery thereof adjacent to the first fitting portion 71a constitutes the tip edge portion 75. The outer diameter of the tip edge portion 75 is the same as or slightly larger than the inner diameter of the rail mounting hole 11.

Like that of the first embodiment, regarding the closing cap 70a according to the second embodiment, the leading end portion 72 can also be manually pushed into the rail mounting hole 11 by an operator. As a result, the closing cap 70a can be provisionally positioned with a center thereof coinciding with a center of the rail mounting hole 11. Thus, it is possible to prevent a trouble that the closing cap 70a is press-fitted into and fixed to the rail mounting hole 11 while being inclined with respect thereto. In the closing cap 70a according to the second embodiment, the outer peripheral surface 77 of the leading end portion 72 is formed to be a tapered shape. Therefore, the leading end portion 72 can be easily inserted into the rail mounting hole 11.

Figure 6A:
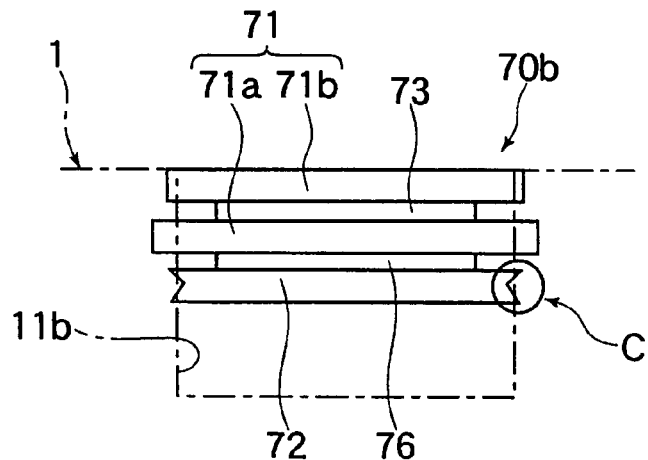
FIG. 6a is a front view showing a third embodiment of a closing cap used in the present invention.
Figure 6B:
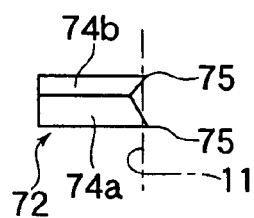

FIG. 6a shows a third embodiment of a closing cap for the rail mounting hole 11, to which the present invention is applied. FIG. 6b is an enlarged view of a portion C of FIG. 6a. In a closing cap 70b shown in FIG. 6a, a first fitting portion 71a and a second fitting portion 71b each have the same structure as that of the closing cap 70 according to the first embodiment of the present invention shown in FIG. 4a, and only the leading end portion 72 has a structure different from that of the first embodiment.

As shown in FIG. 6b, in the closing cap 70b according to the third embodiment, positioning protrusions 74a and 74b are formed in two positions on the outer peripheral surface of the leading end portion 72 at an axial interval from each other. A portion between the positioning protrusions 74a and 74b is notched to form a V-shaped configuration. That is, in the closing cap 70b according to the third embodiment, an annular groove having a V-shaped section in the outer peripheral surface of the leading end portion 72 formed in the columnar shape, thereby forming the positioning protrusions 74a and 74b in two lines, each having a substantially triangular section. An outer diameter of each of the tip edge portions 75 of the positioning protrusions 74a and 74b is the same or slightly larger than the inner diameter of the rail mounting hole 11.

Like that of the first embodiment, regarding the closing cap 70b according to the third embodiment, the leading end portion 72 can also be manually pushed into the rail mounting hole 11 by an operator. As a result, the closing cap 70b can be provisionally positioned with a center thereof coinciding with a center of the rail mounting hole 11. Thus, it is possible to prevent a trouble that the closing cap 70b is press-fitted into and fixed to the rail mounting hole 11 while being inclined with respect thereto.

In the closing cap 70b of the third embodiment, the pair of positioning protrusions 74a and 74b are formed at an axial interval from each other on the leading end portion 72. Therefore, after the leading end portion 72 is manually fitted into the rail mounting hole 11, a position of the closing cap 70b easily becomes stable, so a press-fitting operation of the first fitting portion 71a and the second fitting portion 71b using a tool can be smoothly performed. Thus, it is possible to more positively prevent a trouble that the closing cap 70b is press-fitted into and fixed to the rail mounting hole 11 while being inclined with respect thereto.

Figure 7A:
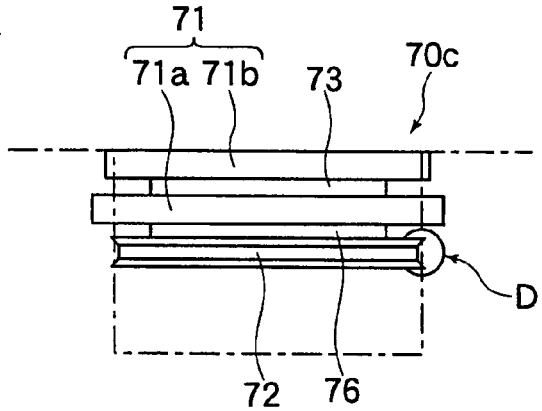
FIG. 7a is a front view showing a fourth embodiment of a closing cap used in the present invention.
Figure 7B:
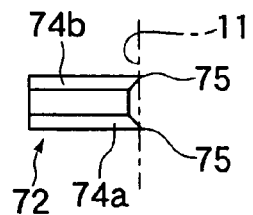

FIG. 7a shows a fourth embodiment of a closing cap of the rail mounting hole 11, to which the present invention is applied. FIG. 7b is an enlarged view of a portion D of FIG. 7a. The closing cap 7c shown in FIG. 7a is substantially the same as the closing cap 70b according to the third embodiment shown in FIG. 6a, however, a gap between the pair of positioning protrusions 74a and 74b formed on the leading end portion 72 is set larger than that in the third embodiment.

That is, as shown in FIG. 7b, in the closing cap 70c according to the fourth embodiment, a notch groove having a trapezoidal section is formed in the outer peripheral surface of the leading end portion 72, thereby forming the positioning protrusions 74a and 74b in two positions at an axial interval from each other. Like in the third embodiment, the outer diameter of each of the tip edge portion 75 of the positioning protrusions 74a and 74b is the same as or slightly larger than the inner diameter of the rail mounting hole 11.

As a result, in the closing cap 70c according to the fourth embodiment, after the leading end portion 72 is manually fitted into the rail mounting hole 11, a position of the closing cap 70c easily becomes stable as compared to the closing cap 70b, so the press-fitting operation of the first fitting portion 71a and the second fitting portion 71b using a tool can be smoothly performed.

Note that, in the above embodiments, the positioning protrusion 74 is formed to have the substantially triangular section, and a side obtained by allowing two surfaces to intersect each other constitutes the tip edge portion 75. However, the positioning protrusion 74 is not necessarily formed to have the substantially triangular section. For example, the positioning protrusion 74 may protrude from the outer peripheral surface of the leading end portion 72 to have a semicircular section, and an apex of an arc thereof may constitute the tip edge portion 75. It is essential only that the shape of the positioning protrusion 74 is determined such that, when the leading end portion 72 of the closing cap 70 is pushed into the rail mounting hole 11, a minute area of the positioning protrusion 74 comes into contact with the inner peripheral surface of the rail mounting hole 11.

The invention claimed is:

1. A combination, comprising:
   a track rail of a guide device having a rail mounting hole therein, and
   a closing cap including
      a fitting portion having an outer diameter larger than an inner diameter of the rail mounting hole, to be press-fitted into the rail mounting hole; and
      a leading end portion to be inserted into the rail mounting hole before press-fitting the fitting portion into the rail mounting hole, for provisionally positioning the closing cap with respect to the rail mounting hole;
   wherein the leading end portion is provided with a positioning protrusion having a tip edge portion, protruding from a periphery of the leading end portion, the tip edge portion having an outer diameter which is the same or slightly larger than the inner diameter of the rail mounting hole,
   wherein the fitting portion comprises a first fitting portion and a second fitting portion each having a disc shape, the first fitting portion and the second fitting portion being coupled with each other through a columnar spacer portion having an outer diameter smaller than the inner diameter of the rail mounting hole, and
   wherein the first fitting portion is positioned between the leading end portion and the second fitting portion, the first fitting portion having an outer diameter larger than the inner diameter of the rail mounting hole, and the second fitting portion having an outer diameter which is smaller than the outer diameter of the first fitting portion and is larger than the inner diameter of the rail mounting hole.

2. The combination according to claim 1, wherein the positioning protrusion has a substantially triangular section.

3. The combination according to claim 1, wherein a diameter of a base circle of the positioning protrusion is smaller than the inner diameter of the rail mounting hole.

4. The combination according to claim 3, wherein the leading end portion and the fitting portion are connected to each other through a shaft portion having an outer diameter smaller than the diameter of the base circle of the positioning protrusion.

5. The combination according to claim 1, wherein the leading end portion further comprises a second tip edge portion, such that tip edge portions are formed in two positions on the periphery of the leading end portion with an axial interval from each other.

6. The combination according to claim 1, wherein a corner portion on an outer periphery of the second fitting portion and a corner portion at an inlet of the rail mounting hole are formed to have a right angle without being chamfered.

7. The combination according to claim 1, wherein an outer peripheral surface of the leading end portion has a tapered surface and has a positioning groove.

* * * * *